United States Patent [19]

Wyrostek et al.

[11] Patent Number: 4,756,667
[45] Date of Patent: Jul. 12, 1988

[54] PITCH CONTROL CAPACITANCE COUPLING

[75] Inventors: Albert J. Wyrostek, East Windsor; Millard G. Mayo, Wethersfield, both of Conn.

[73] Assignee: United Technologies Corporation, Hartford, Conn.

[21] Appl. No.: 69,683

[22] Filed: Jul. 6, 1987

[51] Int. Cl.⁴ .................................. B64C 11/44
[52] U.S. Cl. ........................... 416/155; 416/48
[58] Field of Search .................. 416/155, 49, 48

[56] References Cited

U.S. PATENT DOCUMENTS

| | | | |
|---|---|---|---|
| 1,848,490 | 3/1932 | Nicolson | 340/208 X |
| 1,912,213 | 5/1933 | Nicolson | 340/208 X |
| 2,117,019 | 5/1938 | Conrad | 171/314 |
| 2,293,912 | 8/1942 | Mullen | 416/48 |
| 2,386,377 | 10/1945 | Williams | 416/155 |
| 2,406,196 | 8/1946 | Chilman | 416/155 |
| 2,446,658 | 8/1948 | Maynard | 416/155 |
| 2,491,172 | 12/1949 | Forsyth | 416/155 X |
| 2,555,355 | 6/1951 | Macgeorge | 73/88.5 |
| 2,556,556 | 6/1951 | Schmitt et al. | 177/351 |
| 2,610,994 | 9/1952 | Bosch et al. | 171/329 |
| 2,611,811 | 9/1952 | Yates | 177/351 |
| 2,614,171 | 10/1952 | Fein | 178/44 |
| 2,620,447 | 12/1952 | Malpica | 307/88 |
| 2,668,283 | 2/1954 | Mullin | 340/174 |
| 2,669,310 | 2/1954 | Haskins | 416/48 |
| 2,675,540 | 4/1954 | Schultheis, Jr. | 340/184 |
| 2,715,707 | 8/1955 | Haskins | 416/48 X |
| 2,828,475 | 3/1958 | Mason | 340/2 |
| 2,925,590 | 2/1960 | Boltinghouse et al. | 340/200 |
| 2,930,033 | 3/1960 | Webb | 340/347 |
| 3,020,007 | 2/1962 | Hine | 416/48 X |
| 3,121,839 | 2/1964 | Malenick et al. | 323/75 |
| 3,132,337 | 5/1964 | Martin | 340/347 |
| 3,179,825 | 4/1965 | Terry et al. | 310/67 |
| 3,272,393 | 9/1966 | Spark | 73/344 |
| 3,280,368 | 10/1966 | Ahmed et al. | 315/208 |
| 3,317,765 | 5/1967 | Cone | 310/74 |
| 3,435,267 | 3/1969 | Beyersdorf et al. | 310/168 |
| 3,573,520 | 4/1971 | Dorshimer | 310/168 |
| 3,900,274 | 8/1975 | Johnston et al. | 416/155 |
| 4,591,313 | 5/1986 | Miyatake et al. | 416/155 |

FOREIGN PATENT DOCUMENTS 798233 5/1936 France .................. 416/155

*Primary Examiner*—Everette A. Powell, Jr.
*Attorney, Agent, or Firm*—Lloyd D. Doigan

[57] ABSTRACT

A master controller 14 on the stationary side of a propeller system 10 sends pitch control signals via a communications link 34 which comprises a pair of capacitors 64, 66, each capacitor having a stationary plate and a rotating plate, one capacitor forming a high potential signal path, the other capacitor forming a low potential return path, across a rotating gap to a slave controller 54 on the rotating side of the propeller system which sets blade pitch according to the pitch control signals and sends pitch position signals back through the communications link to the master controller.

2 Claims, 3 Drawing Sheets

4,756,667

PITCH CONTROL CAPACITANCE COUPLING

DESCRIPTION

1. Technical Field

This invention relates to a mechanism for transferring propeller pitch control information across a rotating gap and more particularly to such a mechanism incorporating a two way capacitance coupling.

2. Background Art

Variable pitch propeller systems include a stationary side having a gearbox and an engine, and a rotating side having a hub with a plurality of variable pitch propeller blades mounted therein. Typically, a master controller mounted on the stationary side sends electrical signals across the rotating interface between the stationary and rotating sides to a slave controller which sets the pitch of the propeller blades. Historically the signals have been passed across the rotating interface by utilizing brushes and slip rings. Brushes and slip rings, however, are expensive, require frequent maintenance, and have high noise to signal ratios.

A capacitance coupling has been used successfully to transfer signals across the rotating interface between the stationary and rotating sides of a propeller system. U.S. Pat. No. 3,573,520 to Dorshimer, entitled "Rotating Body Having Combined Power Generating A Signal Coupling System" and owned by the common assignee herein, uses a capacitance coupling as a part of a self powered, FM multiplex system for the measurement of a propeller blade strain. Dorshimer however, is not ideal for continuous use as required in propeller systems. In a typical Dorshimer application the circuit is grounded to the airframe. The grounded current, while small in magnitude, has a high current density. The current may migrate back to the rotating side through the rotating side support bearings. The support bearings may not provide a constant contact between the rotating and stationary sides so that some arcing, and a subsequent pitting of the support bearings, may occur. This is clearly undesirable.

SUMMARY OF THE INVENTION

An object of the present invention is to achieve two way communication across the rotating gap between the rotating and stationary sides of a propeller system without the noise and maintenance cost of brushes and slip rings and with the advantages of capacitive coupling.

According to the invention, a master controller on the stationary side of a propeller system sends pitch control signals via a communications link which comprises a pair of capacitors, each capacitor having a stationary plate and a rotating plate, one capacitor forming a high potential signal path, the other capacitor forming a low potential return path, across a rotating gap to a slave controller on the rotating side of the propeller which sets blade pitch according to the pitch control signals and sends pitch position signals back through the communications link to the master controller.

A propeller system includes a transceiver mounted upon the stationary side of the propeller system that sends control signals to set blade pitch across a rotating gap and to receive position signals relative to the blade pitch, a second transceiver mounted on the rotating side of the propeller system for receiving the control signals and for sending the position signals, a high side capacitor having a first plate mounted to the stationary side and electrically attaching to the first transceiver and having a second plate mounted to the rotating side and electrically attaching to the second transceiver so that the high side capacitor provides a high potential signal path for the control signals passing across the rotating gap from the first transceiver to the second transceiver and for the position signals across a rotating gap from the second transceiver to the first transceiver, and a low side capacitor having a first plate mounted to the stationary side and electrically attaching to the first transceiver and a second plate mounted to the rotating side and electrically attaching to the second transceiver so that the low side capacitor provides a low potential return path for the control signals from the second transceiver to the first transceiver and the position signals from the first transceiver to the second transceiver.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
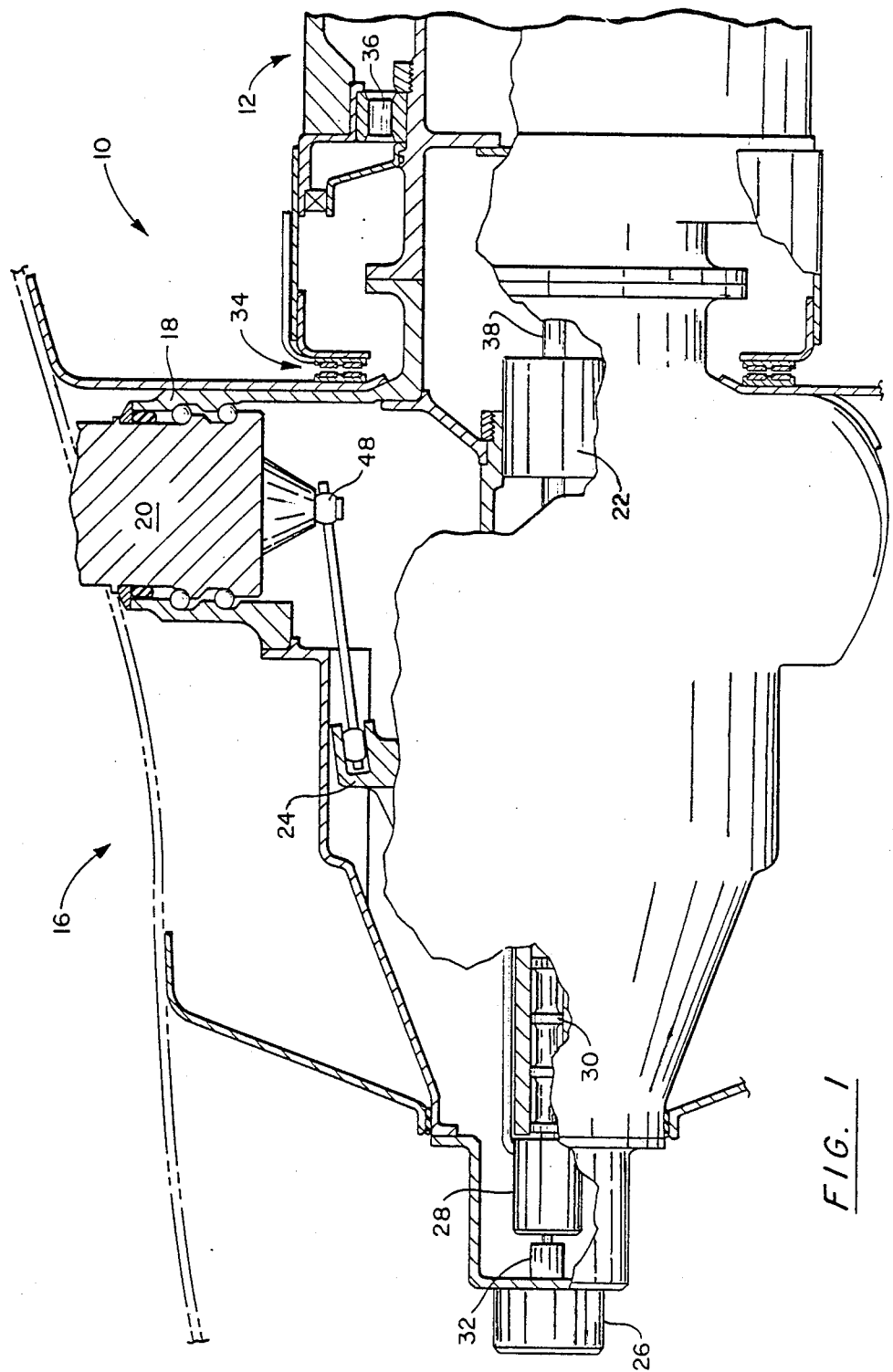
FIG. 1 is a prospective view, partially broken away, of portions of a propeller assembly adapted in accordance with the present invention.

A portion of a propeller system 10 is illustrated in FIG. 1. The propeller system has a stationary side 12 generally including an engine and gearbox (not shown) and a full master authority digital electronic control 14 (FADEC shown schemtically in FIG. 3), and a rotating side 16 including a hub 18, a plurality of propellers 20, an alternator 22, a pitch control mechanism 24, an electronic control module (ECM) 26, a servo motor 28, a beta valve 30 for controlling pitch and a rotary variable displacement transducer (RVDT) 32. Signals are passed across a rotating gap to control pitch by means of a embodiment of a two way capacitance coupling (communication link) 34 as will be discussed infra.

The stationary side 16 supports the hub 18 via main bearings 36. The engine provides a rotative drive to the hub through the gearbox and a rotative force through shaft 38 to provide electrical and hydraulic power within the rotating hub. The stationary side houses a first transceiver 40, a power supply 12 and the FADEC 14 (shown schematically in FIG. 3). The first transceiver is of the differential type, as is well known in the art, having a high potential terminal 44 and a low potential terminal 46. The first transceiver may send and receive information in either a half-duplex or a full-duplex format.

The hub 18 mounts a plurality of propeller blades 20 mounted as is well known in the art. The pitch of the propeller blades may be varied by any means known to one of ordinary skill in the art. An hydraulic type system is shown wherein the servo motor 28 positions the beta valve 30 to port hydraulic fluid thereby moving the pitch control mechanism 24 longitudinally. (The hydraulic fluid driven pitch control mechanism 24 is shown schematically as line 47 in FIG. 3.) The movement of the mechanism changes blade pitch through an eccentric cam 48 as is well known in the art. The alternator 22 is rotated by the shaft 26 and transmits electrical power to the ECM 26. The ECM includes a rectifier 50, a regulator 52, a second transceiver 54 for communicating with, and identical to, the first transceiver 40 on the stationary side having a high potential terminal 56 and a low potential terminal 58, and a slave microprocessor 60. The RVDT 32 attaches to the blade through gearing (shown schematically in FIG. 3 as line 62) and sends an output to the slave microprocessor 60.

The alternator provides alternating current which is converted to direct current by the rectifier. The direct current is transmitted to the voltage regulator which provides the appropriate voltages to the electronic and electrical equipment on the rotating side. The power supply 42 on the stationary side provides power for the transceiver and the FADEC.

Figure 2:
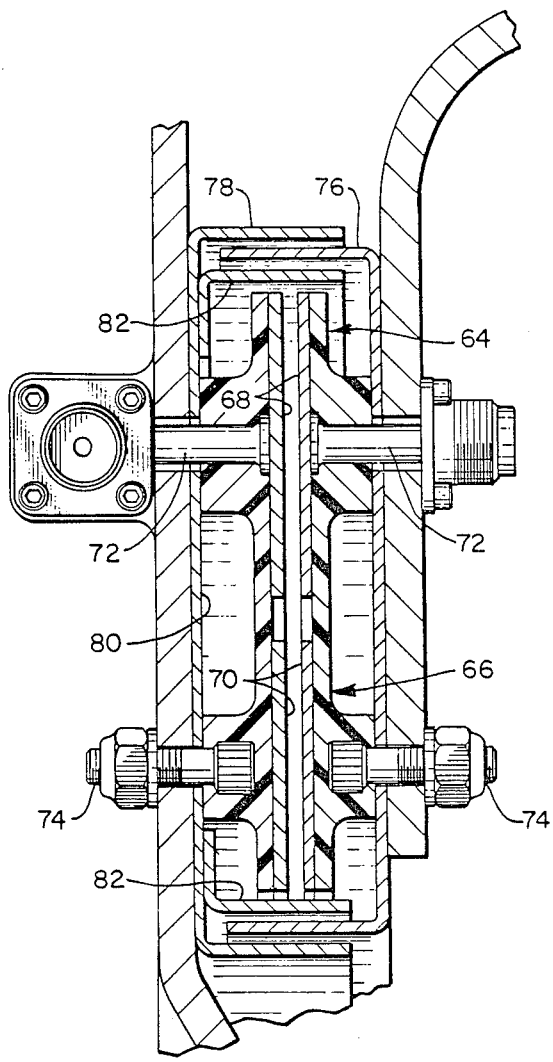
FIG. 2 is a magnified view of a communication link of FIG. 1.

Referring to FIG. 2, an expanded view of the two way capacitance coupler 34 of FIG. 1 is shown. A high potential capacitor 64 and a low potential capacitor 66 are shown. Each capacitor consists of a pair of plates 68, 70. Each plate of each pair is a flat ring extending around a center line 71 of the hub. Each pair of plates is concentric with the other pair of plates. The plates of the low potential capacitor plates are attached to the rotating and stationary sides by nuts and bolts 74. Electrical connection to the high potential capacitor plates is made through electrodes 72. Other bolts (not shown) connect the high potential capacitor plates to the rotating and stationary sides at another radial position. Similarly, electrical connection to the low potential capacitor plates is provided at another radial position by other electrodes (not shown). The plates attaching to the rotating side rotate therewith. A first ringlike shroud 76 having a U-shaped cross section cooperates with a second ringlike shroud 78 having a U-shaped cross section with a longer base portion 80 mounted to the rotating side to provide protection for the capacitance rings. The second shroud may have an inner legs 82 cooperating with the first shroud 76 to effect a labyrinth type seal between the two shrouds. Wires 84, 86, 88, 90 (shown schematically in FIG. 3) electrically connect the electrodes (as is well known in the art) of a capacitor 64, 66 to either the first or second transceiver as shown.

Figure 3:
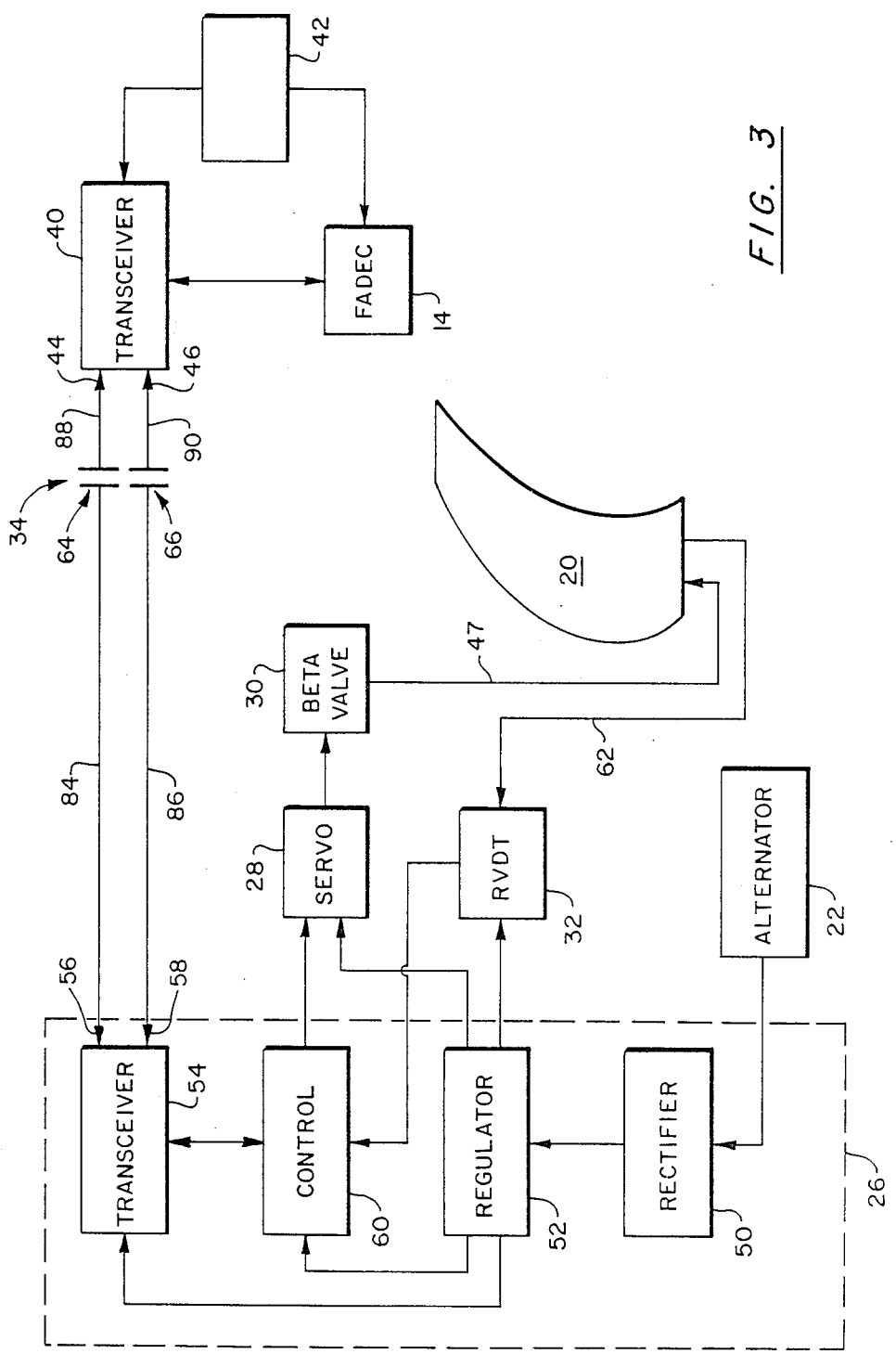
FIG. 3 is a simplified schematic block diagram of an electrical system in accordance with the present invention.

Referring to FIG. 3 the operation of the system is detailed. The FADEC 14 inputs a signal to the first transceiver 40 to change blade pitch. The first transceiver sends a digitized signal in either a half-duplex or full-duplex mode, in a differential manner through the high potential terminal 44. The signal is coupled through the high potential capacitor 64 and is received in the second transceiver 56 within the ECM 26. The second transceiver 56 directs the signal to the slave microprocessor 60 in the ECM which directs the servo 28 to position the beta valve 30 as required. The beta valve 30 then ports hydraulic fluid, as is well known in the art, to position the propeller blade 20. The RVDT 32 monitors the propeller blade pitch and inputs real time pitch data into the slave microprocessor 60. The slave microprocessor relays the blade pitch information to the second transceiver 54 which sends the information through its high potential terminal 56 in a differential manner back to the first transceiver 40. The first transceiver relays the information to the FADEC which determines whether its instructions have been carried out and whether further instructions are required. The low potential terminals 46, 58 on the transceivers 40, 54 provide a return path for the circuit across the low potential capacitor 66 such that no stray currents migrate across the bearing surfaces supporting the rotating structure. The differential feed across the low potential and high potential side provides improved noise rejection.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A variable pitch propeller system having a stationary side and a rotating side, said rotating side including a plurality of variable pitch propeller blades, as characterized by:

first means mounted upon said stationary side for sending control signals to set blade pitch and for receiving position signals relative to said blade pitch;

second means mounted upon said rotating side for receiving said control signals and for sending said position signals; and a communications link for carrying said signals between said first and second means, said link having;

a high side capacitor having a first plate mounted to said stationary side and electrically attaching to said first means, and having a second plate mounted to said rotating side and electrically attaching to said second means such that said high side capacitor provides a high potential signal path for said control signals from said first means to said second means and for position signals from said second means to said first means; and a low side capacitor having a first plate mounted to said stationary side and attaching electrically to said first means and a second plate mounted to said rotating side and electrically attaching to said second means such that said low side capacitor provides a differential, low potential return path for said control signals from said second means to said first means and said position signals from said first means to said second means.

2. The variable pitch propeller system of claim 1, further characterized by:

said high side capacitor and said low side capacitor being concentric.

* * * * *